Nov. 26, 1940. L. L. JONES Re. 21,632
ELECTRIC STEAM IRON
Original Filed March 5, 1938 3 Sheets-Sheet 1
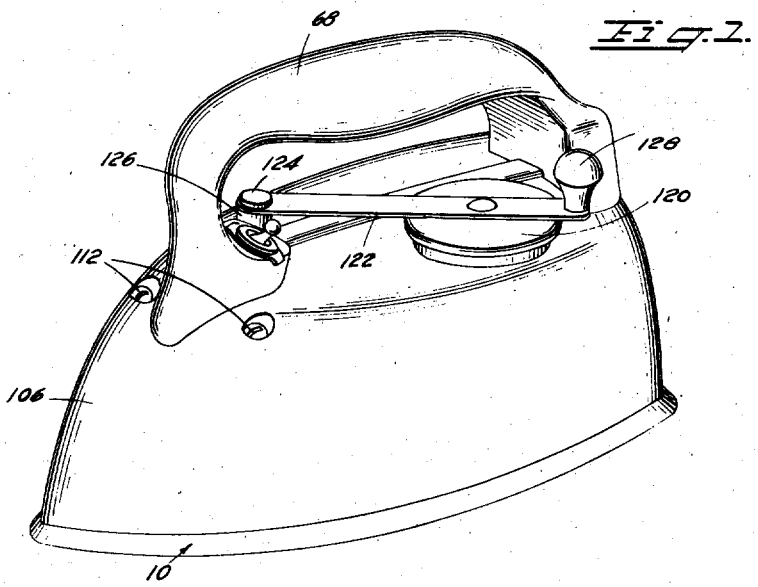
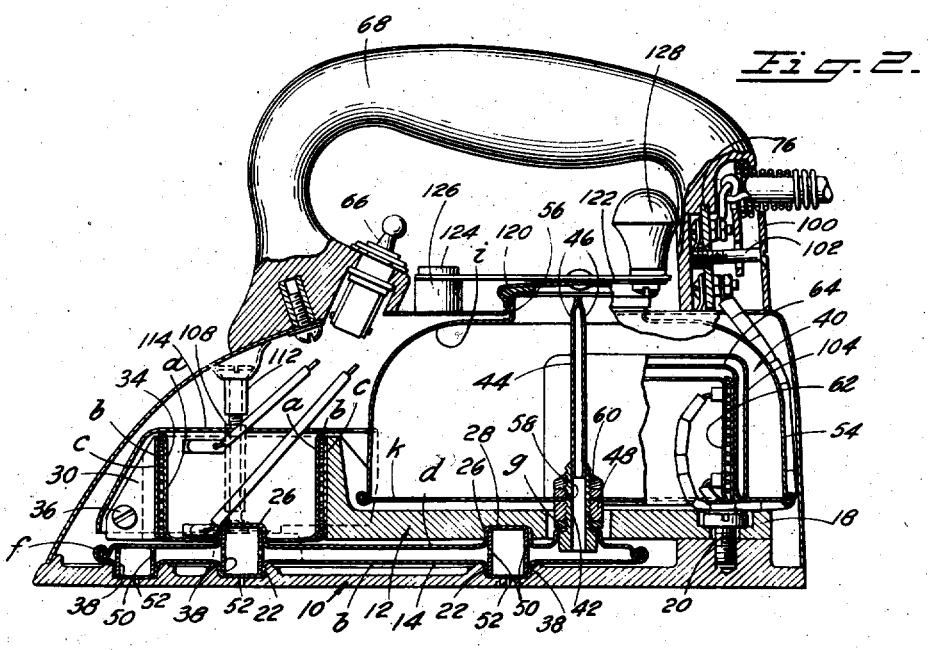
INVENTOR
LESTER L. JONES
BY
James & Franklin
ATTORNEY Nov. 26, 1940. L. L. JONES Re. 21,632

ELECTRIC STEAM IRON

Original Filed March 5, 1938 3 Sheets-Sheet 2

INVENTOR
LESTER L. JONES
BY
James & Franklin
ATTORNEY

Nov. 26, 1940. L. L. JONES Re. 21,632

ELECTRIC STEAM IRON

Original Filed March 5, 1938 3 Sheets-Sheet 3

INVENTOR
LESTER L. JONES
BY James x Franklin
ATTORNEY

Reissued Nov. 26, 1940

Re. 21,632

UNITED STATES PATENT OFFICE 21,632

ELECTRIC STEAM IRON

Lester L. Jones, Oradell, N. J.

Original No. 2,179,259, dated November 7, 1939, Serial No. 194,055, March 5, 1938. Application for reissue September 13, 1940, Serial No. 356,672

32 Claims. (Cl. 219—25)

This invention relates to an improved electric steam iron particularly adapted for household use.

A prime object of the invention deals with the provision of an electric steam iron in which the proper distribution to the ironing sole or plate of the required heat and moisture is produced. The desideratum on this phase of the problem sought to be achieved by the present invention is the obtaining of that distribution and supply to the full area of the ironing sole or plate of heat and moisture (steam) which will enable the production of uniform ironing temperatures on the goods or material under ironing treatment and the uniform evaporation of the moisture supplied thereto.

A further prime object of the invention resides in the provision of an electric steam iron in which the generation of the required heat and steam is accomplished to meet the best needs of service. On this phase of the problem, the desiderata sought to be achieved by the invention are the abilities (1) to rapidly bring (initially) the heating system and the steam generating system up to conditions of ironing use, (2) to independently control the steam generating system so that the supply of moisture to the goods under ironing treatment may be discontinued and restarted at will, without interfering with the operating conditions of the heating system, and (3) to maintain the steam generating system in an operating state (particularly during periods of discontinuance of steam supply) so that when restarted, steam will be supplied therefrom to the ironing sole or plate instantaneously.

Other important objects of the invention center about (a) the provision of an electric steam iron in which the above referred to problems of securing the desired generation and distribution of heat and steam are solved by simple mechanism coordinated to produce an electric steam iron of large power, small weight, correct balance and neat appearance, (b) the provision of an electric steam iron of this character in which the component parts are constructed and related so as to enable quick access to the same for use, repair and replacement of parts, and (c) the provision of such an electric steam iron embodying means for giving audible evidence of the proper operation and the necessity for refilling the steam generating receptacle.

To the accomplishment of the foregoing and such other objects as may hereinafter appear, the invention pertains to the electric steam iron and the combinations of elements thereof, as sought to be defined in the appended claims, and as described in the following specification taken in conjunction with the drawings, of which:

Fig. 1 is a perspective view of the electric steam iron of the present invention showing the external appearance thereof;

Fig. 2 is an elevational view thereof with parts shown in section and other parts broken away, disclosing the interior construction thereof;

The achievement of the stated objects of the invention which deal with the proper distribution to the ironing sole or plate of the required heat and moisture and the control thereof to meet the varying needs of service, may be shown by describing, in sequence, the structural and functional relation between (1) the heating system and the ironing sole, (2) the steam producing system and the ironing sole, and (3) the heating system and the steam producing system.

Figure 4:
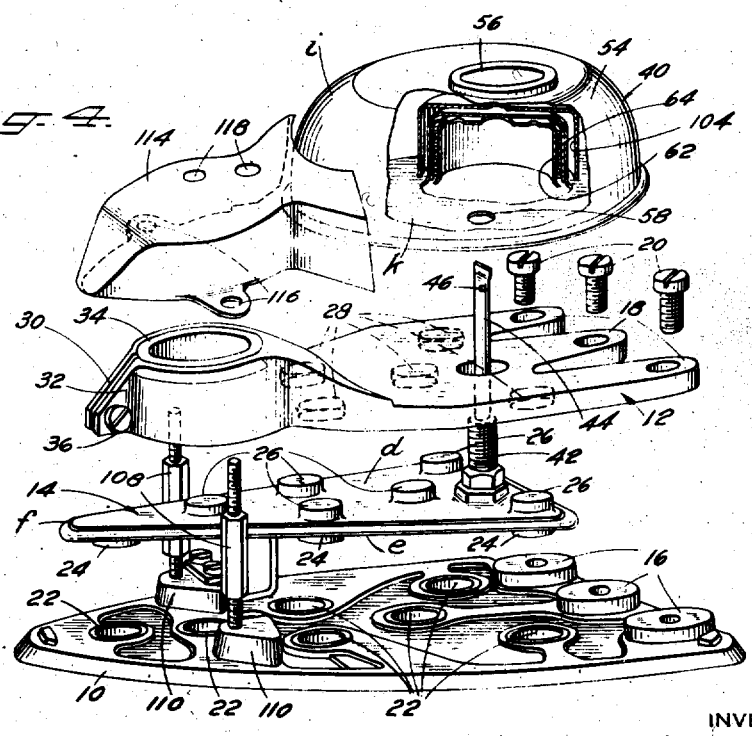
Fig. 4 is a perspective view showing the elements of the heating and steam producing systems in displaced or exploded condition.

In the customary irons, the uniform temperature desired on the goods is secured by using a large mass of metal (for the ironing sole) with a heater distributed over substantially all of the area of the metal. In the iron of the present invention, a small mass of metal for the ironing sole or plate is used, the heater (a heater unit) is concentrated or localized at the nose of the iron, and a heat distributor is employed for thermally connecting the heater unit with the ironing sole, these parts being so constructed and coordinated that the intended heat distribution for producing the uniform ironing temperatures is obtained. This is best shown in Figs. 2 and 4 of the drawings, the ironing sole comprising the flat, relatively thin plate generally designated as 10, the heater system consisting of the unit generally designated as 12 having an area substantially co-extensive with the ironing sole or plate 10, the said heating system being thermally connected to the ironing sole by a thermal network comprising in part an intermediate member generally designated as 14 providing selected heat conducting channels between the heating system 12 and the ironing sole 10, the said heating system being also connected in part directly to the ironing sole by additional heat conducting channels in a manner to be described presently. The intermediate member 14 of this thermal network also forms, as will be described hereinafter, the steam distributing system of the steam iron.

Figure 5:
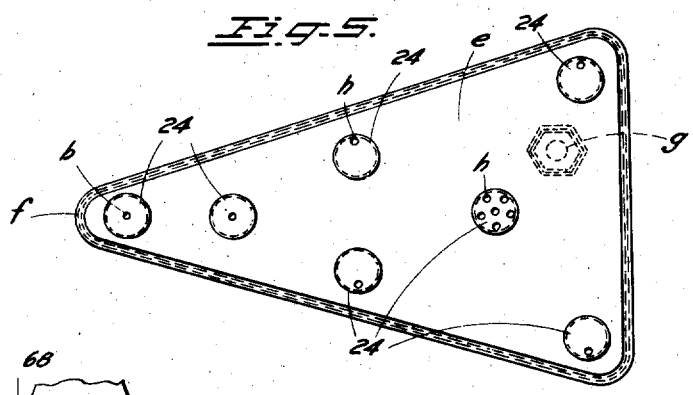
Fig. 5 is a bottom plan view of the steam distributing chamber unit.
Figure 7:
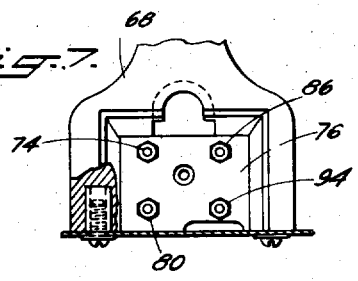
Fig. 7 is a view of a detail.

The heat distributor 12 thermally connects with the sole 10 at a plurality of selected points or places ditributed over the full area of the sole, and this thermal network is determined so that each place serves an approximately equal area of the sole. There is a large temperature gradient from nose to heel in the heat distributor; at the nose the temperature is 600° F., at the central region the temperature is about 450° F., and at the heel the temperature is about 350° F. If a uniform sole temperature (such as 300° F.) is desired, the thermal channels defined by the conducting thermal network are predeterminedly made to differ in heat conductivity. In the exemplified structure, these conducitivies are so determined and fixed that the sole 10 has a uniform temperature of about 300° F. over its area, except at the front end thereof, where the temperature is somewhat higher. All of this is accomplished by having ten (for example) thermal conducting channels; seven of which are through the material of the intermediate member 14 (the steam distributor), and the remaining three of which are directly into the sole. These latter three are at the heel of the iron, and consist of three similar cast iron masses integral with the sole 10, forming the bosses 16 to which the finger-like projections 18 formed at the heel of the heat distributor 12 are directly attached by means of the securing screws 20. The other seven thermal channels are provided by the seven socket-recesses 22, 22 formed in the sole 10 with which mate seven plug-projections 24, 24 formed in the bottom wall of the member 14 (see particularly Figs. 4 and 5), the top wall of the said member 14 being in turn provided with the six plug-projections 26, 26, the front one of which connects directly with the heater of the heating system, and the other five of which mate with socket-recesses 28, 28 formed in the body of the heat distributor 12.

The heating system 12 consists of a metallic unit (preferably an aluminum casting) having the heat generator in the form of an electric heater concentrated or localized at the front end or nose portion thereof. The main body of this unit is flat, as clearly depicted in Figs. 2 and 4 of the drawings, and the front end thereof is provided with the enlarged split collar sections 30 and 32 which receive therebetween the electric heater 34, which latter is firmly secured in position by clamping together the collar sections 30 and 32 by means of a screw 36. The heater 34 consists in detail of a receptacle-like holder *a* having a heater element *b* wound on and baked to the outside wall thereof and a protecting outer shell *c* enclosing the heater element, as most clearly shown in Fig. 2 of the drawings. This localized or concentrated heater 34 operates at a relatively high temperature, and feeds heat to all parts of the heat distributor 12, the heat flowing thence through the thermal network described, into the selected points or places of the ironing sole 10.

The desired thermal flow between the heat distributor 12 and the ironing sole 10 is determined and fixed by suitable design of the described thermal channels. At the heel of the iron, where the temperature difference (between the heat distributor and the ironing sole) is about 50° F., the heat conducivity of the thermal channels should be about three times as great as that of the channels in the central part of the iron, where the temperature difference is about 150° F. At the nose of the iron, where the temperature difference is larger, the heat conductivities of the channels have to be so predetermined as to secure the desired temperature at the nose of the ironing sole. These interrelated results are secured by directly connecting the finger-like projections 18 of the heat distributor to the integral bosses 16 of the ironing sole as already described, and by connecting the body of the heat distributor 12 through the intermediate member 14 to the remaining part of the sole 10 by way of the material of the intermediate member 14 and the tubular members or liners 38, 38 (see Fig. 2) fitted interiorly to the plug-projections formed in the intermediate conducting member 14. These liners 38 may be made solid or split, depending upon the heat flow desired, the liners being shown solid in the structure exemplified in the drawings. The thermal flow at all of the plug-recess connections is through the top and bottom walls of the intermediate member 14, and through the direct connections between these walls provided by these liners or tubular members 38, 38. As shown in Fig. 2 of the drawings, one of these connections is directly between the heater 34 and the ironing sole 10.

The combination of the steam producing system and the ironing sole comprises a steam generating unit generally designated as 40 connected by means of a steam distributor to selected points or places in the sole 10 for carrying a supply of moisture in the form of steam to the selected places in the ironing sole. The steam distributor consists of a flat casing extending over a substantial part of the area of the ironing sole, the said casing defining a shallow steam conducting chamber. This steam distributor casing is the intermediate member 14 already described, which forms part of the thermal network connecting the heating system with the ironing sole. This steam distributor casing 14 comprises in detail, a body having the triangular configuration best shown in Figs. 4 and 5 of the drawings, providing upper and lower wall sections *d* and *e*, the marginal edges of which are sealed by a lock seam joint *f*. The top wall *d* is formed with a steam ingress opening *g*, and the bottom wall *e* is formed with a plurality of suitably distributed steam egress openings, *h*, *h*, these openings being formed in the plug-projections 24, 24 as most clearly shown in Figs. 2 and 5 of the drawings. Connected to the top wall *d* of the distributor casing is a threaded nipple 42 supporting a steam channel tube 44 orificed as at 46 at its upper end, the threaded nipple being secured by any suitable means, as by the nut 48, to the casing wall *d* at the steam ingress opening *g* thereof (see particularly Figs. 2 and 4). The tubular members or liners 38 are each suitably provided with orifices 50, 50; and the ironing sole 10 is formed at the selected points or places thereof with the openings or orifices 52, 52 (see Fig. 2) arranged to align with the steam egress openings *h*, *h* in the bottom wall of the steam distributor casing 14.

By means of this construction, generated steam entering the orifices 46 of the steam channel or tube 44, flows into and fills the steam distributor chamber 14, and flows thence through the orifices 50 of the liners 38, through the steam egress orifices *h*, *h* of the distributor, and then into and from the steam openings 52 in the ironing sole at the selected places distributed over the area of the sole. The location of the steam distributor 14 between the heat distributor 12 and the sole 10 enables the superheating of the steam in the distributor chamber 14, and the short steam channels between the steam distributor and the ironing sole permit this superheated steam to issue from the sole without premature condensation taking place, the steam thus being supplied to the goods or the material under ironing treatment in its most desirable state.

An important object of the invention is the constructing of the heat distributor, the steam distributor, and the ironing sole so as to produce superposed elements which not only carry out the described effective thermal connection between the heat distributor and the ironing sole, and steam connection between the steam distributor and the ironing sole, but which in combination occupy a short vertical space permitting ultimately of the production of a compact ironing unit. When these elements are physically connected together as best shown in Fig. 2 of the drawings, such a compact organization is produced. These elements are effectively united by press-fitting the plug-projections 24 and 26 into the socket-recesses 22 (of the sole) and 28 (of the heat distributor), and by the screw attachment provided by the screws 20. In this way these elements are connected together physically, thermally, and for steam distribution. It will be noted that the liners 38, 38, besides serving as thermal conducting elements, also serve as a means for providing a strengthening form for the plug-projections 24—26, and as a strengthening spacing means for the walls *d* and *e* of the steam distributor 14.

The steam generating unit 40 is constructed and designed and related to the heating system of the iron in a way to carry out the other stated objects of the invention, which is to permit rapidly bringing both the heating system and the steam generating system up to conditions of ironing use, to independently control the steam generating system so that the supply of moisture to the goods may be discontinued and restarted at will, without interfering with the operating conditions of the heating system, and to maintain the steam generating system in an operating state (particularly during periods of discontinuance of steam supply) so that when restarted, steam will be supplied therefrom to the ironing sole or plate instantaneously.

To accomplish these results, the steam generating system 40 comprises a receptacle 54 (preferably made of copper) having a body *i* and a bottom *k* joined by a lock seam thereto, the said body *i* being provided with a filling opening 56, and the bottom *k* being provided with an orifice 58 through which is inserted the nipple 42 and the channel tube 44 supported thereby, these being secured to the bottom *k* of the receptacle 54 by means of a nut and washer 60, as most clearly shown in Fig. 2 of the drawings. The receptacle 54 is provided with a separate electric heater. This is desirably accomplished by fitting a heater unit 62 (substantially similar in construction to the heating unit 34) to the receptacle 54, the bottom *k* of the latter being suitably formed for this purpose with a pressed-in socket section 64 which snugly receives the heater unit 62 (see particularly Figs. 2 and 4). In addition to thus providing a separate heater for the steam generator 40, the latter is also thermally related to the heat distributor 12, this being accomplished by locating the receptacle 54 above the body of the heat distributor 12 suitably spaced vertically therefrom, as best shown in Fig. 2 of the drawings. The heater unit 62 is connected in a local circuit (as will be described hereinafter) controlled at will by the operator by means of a switch 66, which is located in the handle 68 of the iron so as to be readily accessible to and manipulable by the user.

By means of this recited construction, separate concentrated heaters are employed for rapidly initially bringing the heating system and the steam generating system up to conditions of ironing use, and the steam generating system may be independently controlled so as to discontinue or restart at will by manipulation of the switch 66, the supply of steam, without interfering with the operating condition of the heating system. The thermal relation between the steam receptacle 54 and the heat distributor 12 is such that when the steam generating heater 62 is shut off, sufficient heat will be conducted through the nipple 42 and will be radiated from the heat distributor 12 to the steam receptacle 54 to keep the water therein at or close to the boiling point, so that as soon as the heater 62 is restarted by the reverse operation of the switch 66, steam will be instantaneously supplied to the ironing sole.

Figure 3:
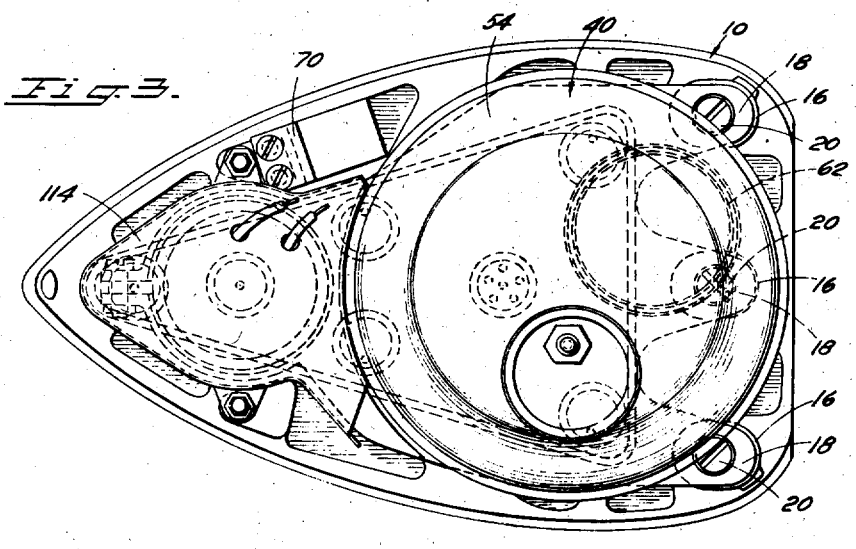
Fig. 3 is a top plan view thereof with the housing casing and handle removed therefrom.
Figure 6:
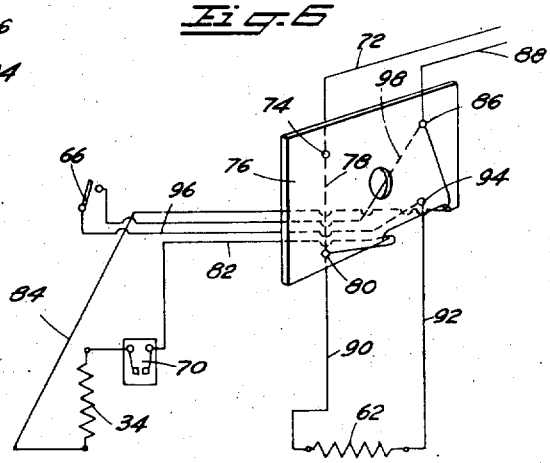
Fig. 6 is a wiring diagrammatic view showing the electrical connections between the parts of the electric steam iron.

The electrical wiring system of the unit is shown in Fig. 6 of the drawings. The ironing heater 34 is connected to the power line through a thermostat 70, the circuit being traceable from one end of the power line 72 to the binding post 74 on an insulating plate 76, thence by means of the line 78 to the binding post 80, thence through the conductor 82, the thermostat 70, the heater element 34, the conductor 84, the binding post 86, and back to the other side of the power line 88. The steam generating heater is connected in a local circuit controlled by the switch 66, the said circuit being traceable from one side of the power line 72, binding post 74, conductor 78, binding post 80, conductor 90, the heater element 62, conductor 92, binding post 94, conductor 96, switch 66, conductor 98, binding post 86, and back to the other side of the power line 88. The insulating plate 76 carrying the stated binding posts is housed in the rear leg of the handle 68, as best shown in Fig. 2 of the drawings, and these parts are enclosed by a removable plate 100 held in position by the attaching screw 102. The thermostat 70 physically comprises a thermostat unit (see Fig. 3) which is attached to the ironing sole 10 and which is designed to open the circuit of the heater 34 when the desired sole temperature is exceeded. By means of this arrangement the heating system and the steam producing system operate independently and are under automatic and manual control to carry out the various stated needs of service.

The steam producing system is desirably provided with a means for giving audible evidence of the proper operation thereof, and of the necessity for refilling the receptacle with water. This, I have found, may be accomplished by the provision of a loose shell 104 which surmounts the socket-section 64 of the receptacle 54. Steam forms between the intrusion in this loose-fitting shell and escapes through a small orifice provided in the top of the shell. When the water level in the receptacle 54 is high, this loose shell gives an audible signal by rattling, and when the water level is low, this audible signal stops, thus indicating to the user that the receptacle should be refilled.

The parts of the iron are suitably enclosed by an enclosing casing 106 which carries the handle 68, the said enclosing casing being attached to the sole 10 by means of two screw posts 108 the lower ends of which are screwed into the bosses 110 formed integrally with the sole 10, and the upper ends of which receive the sleeve screws 112.

For the purpose of minimizing heat transfer by radiation from the high-temperature heating element 34 to parts of the handle 68, or to the enclosing casing 106, I preferably employ a highly polished metal shield between the heating element 34 and the enclosing casing 106. This metal shield is best shown in Figs. 2 and 4 of the drawings, and consists of a suitably formed shell 114 surmounting the heater 34 and its supporting collars 30 and 32, the said shell being held in position by the posts 108, the lower threaded portions of which are received by orificed ears 116 formed on this shell 114. The holes 118 in this shell serve to permit the passing through of the conducting wires to the heater unit 34 (see Fig. 2).

A further detail features of the present invention comprises the use of a spring-held filler cap so mounted as to permit very quick access to the steam receptacle 54 to fill or empty the same. This filler cap comprises a cap 120 having a suitable gasket therein adapted to fit over the filling opening 56 of the receptacle 54, the said cap being loosely secured at its center to a resilient or spring arm 122 pivotally anchored at its far end 124 to a post 126 secured to the enclosing casing 106, and provided at its near end with a finger piece or handle 128. This spring-held filler cap may manifestly be quickly moved between open and closed positions by lifting the handle 128 and rotating the resilient arm 122 about its pivot.

The structural and functional features of the improved electric steam iron of the present invention and the many advantages thereof, will in the main be fully apparent from the above detailed description. The ironing sole 10 and the heating system defined by the heater 34 and the heat distributor 12, are so combined as to enable the production of uniform ironing temperatures on the goods under ironing treatment. The ironing sole 10 is so combined with the steam distributor 14 as to produce the issuance at the desired points on the sole 10 of superheated steam, this being so related to the heating system that a uniform evaporation of the moisture supplied to the goods takes place. The provision of separate concentrated or localized heaters 34 and 62 for the heating and steam generating systems, respectively, enables the operator to rapidly bring the heating system and the steam generating system up to the state of ironing use. The arrangement of the steam producing heater 62 in a local circuit readily controlled by the switch 66 permits the operator to shut off and restart the steam supply at will, without interfering with the operation of the heating system. The thermal interrelation between the steam producing system and the heating system enables the user to maintain the former in such a state that as soon as the switch 66 is operated to restarting position, steam will issue instantaneously in its superheated condition from the ironing sole. The elements of the heating system, steam producing system and the ironing sole are so organized and coordinated as to produce an electric steam iron of large power, small weight, correct balance, and neat appearance. Ready access may be had to refill or empty the steam producing receptacle by a simple manipulation of the spring-held filler cap 120. The various elements of the iron are designed and constructed so as to be capable of ready manufacture and simple assembling steps, the organization being such that the parts may be readily disassembled by the user or the repair man, when repair or replacement of any part is needed.

It will be apparent that many changes may be made in the structure of the parts and their functional interrelation, without departing from the spirit of the invention defined in the appended claims.

I claim:

1. An electric steam iron comprising a heat distributor, an electric heater therefor localized in one region thereof, a steam generating receptacle, a separate electric heater for the steam generating receptacle, the said receptacle being also thermally related to the said heat distributor.

2. An electric steam iron comprising an ironing sole, a heat distributor thermally connected to said sole, an electric heater localized at the nose of said heat distributor, a steam generating receptacle, a separate electric heater for the steam generating receptacle, the said receptacle being thermally related to the said heat distributor at the heel of said distributor.

3. An electric steam iron comprising a heat distributor, an electric heater therefor localized in one region thereof, a circuit for said heater, a steam generating receptacle, a separate electric heater for the steam generating receptacle, a local circuit for said separate heater including a control switch individual thereto, the said receptacle being also thermally related to the said heat distributor.

4. An electric steam iron comprising an ironing sole, a heat distributor, an electric heater for said heat distributor localized at the front end thereof, a steam generating receptacle, a separate electric heater for the steam generating receptacle, the said receptacle being thermally related to the said heat distributor at the rear end thereof, a steam distributor linking said receptacle with the ironing sole, the said steam distributor forming thermal connecting means between said heat distributor and said ironing sole.

5. An electric steam iron comprising an ironing sole, a localized electric heater for the ironing sole, a steam generating receptacle, a separate electric heater for the steam generating receptacle, and means thermally connecting the ironing sole heater with the steam generating receptacle.

6. In an electric steam iron as claimed in claim 5, a circuit for said ironing sole heater and a local switch controlled circuit for said receptacle heater.

7. An electric steam iron comprising an ironing sole, a localized electric heater connected to the ironing sole, a steam generating receptacle, a separate electric heater for the steam generating receptacle, and steam distributing means connecting the receptacle to the ironing sole.

8. An electric steam iron comprising an ironing sole, a heating element, a steam generating receptacle, a steam distributor connecting said receptacle with said ironing sole, and a thermal network connecting the heating element with said ironing sole.

9. An electric steam iron comprising an ironing sole, a heating element, a steam generating receptacle, a steam distributor connecting said receptacle with said ironing sole, and a thermal network connecting the heating element with said ironing sole, the said steam distributor constituting at least part of said thermal network.

10. An electric steam iron comprising an ironing sole, a heating element, a steam distributor arranged between said heating element and said ironing sole, the said steam distributor constituting at least part of the network thermally connecting the heating element with said ironing sole.

11. An electric steam iron comprising an ironing sole, a heating element, a steam distributor arranged between said heating element and said ironing sole, the said heating element being united at spaced points to the steam distributor and the latter being united at spaced points to the ironing sole, said spaced uniting points defining thermal channels between the heating element and the ironing sole.

12. An electric steam iron comprising an ironing sole, a heat distributor, a heating element located at the nose of the heat distributor, a steam generating receptacle, a steam distributor connecting said receptacle with said ironing sole, and a thermal network connecting the heat distributor with said ironing sole.

13. In an electric steam iron, a heat and steam distributing system extending over substantially the ironing area and occupying a short vertical space in the iron comprising the following superposed elements: a flat ironing sole, a shallow steam distributor next adjacent to the sole and connected thereto, and a flat heat distributor next adjacent to the steam distributor and connected thereto, and a heating element connected with the heat distributor.

14. In an electric steam iron, a heat and steam distributing system extending over substantially the ironing area and occupying a short vertical space in the iron comprising the following superposed elements: a flat ironing sole, a shallow steam distributor located next adjacent to the sole and connected thereto at selected points spaced over the ironing sole area, and a flat heat distributor next adjacent to the steam distributor and connected thereto at selected points spaced over the steam distributor, and a heating element connected with the heat distributor.

15. In an electric steam iron, a heat and steam distributing system extending over substantially the ironing area and occupying a short vertical space in the iron comprising the following superposed elements: a flat ironing sole, a flat casing defining a shallow steam distributor located next adjacent to the sole and connected thereto at selected points spaced over the ironing sole area, a flat heat distributor located next adjacent to the steam distributor and connected thereto at selected points spaced over the steam distributor, and an electric heater localized at the nose of the heat distributor.

16. In an electric steam iron, a heat and steam distributing system extending over substantially the ironing area and occupying a short vertical space in the iron comprising the following superposed elements: a flat ironing sole provided on its top face with spaced socket-recesses, a shallow steam distributor casing located next adjacent to the sole provided at its top and bottom walls with spaced plug-projections, and a flat heat distributor located next adjacent to the steam distributor provided on its bottom face with spaced socket-recesses, the plug-projections of the distributor casing being press-fitted into the socket-recesses of the heat distributor and sole, and a heating element connected with the heat distributor.

17. In an electric steam iron, a heat and steam distributing system extending over substantially the ironing area and occupying a short vertical space in the iron comprising the following superposed elements: a flat ironing sole, a flat steam distributor casing next adjacent to the sole, and a flat heat distributor next adjacent to the steam distributor, and plug and recess formations in said elements connecting the elements together physically, thermally and for steam distribution, and a heating element connected with the heat distributor.

18. An electric iron comprising an ironing sole, a heat distributor, an electric heater localized in a section of the heat distributor, and a thermal network connecting the heat distributor to the ironing sole at selected points spaced over the ironing sole area.

19. An electric iron comprising a flat ironing sole, a flat heat distributor extending over substantially the area of the ironing sole, an electric heater localized in a section of the heat distributor, and a thermal network connecting the heat distributor to the ironing sole at selected points spaced over the ironing sole area.

20. An electric steam iron comprising a flat ironing sole, an electric heater connected thereto, a flat steam distributor casing, and means connecting the casing to the sole at selected spaced points over the sole area for flowing steam from the distributor to said selected points of the sole.

21. The electric steam iron claimed in claim 20, wherein the connecting means consists of press-fitted plug and recess formations in the contiguous walls of the casing and sole.

22. In an electric steam iron, in combination with an ironing sole and a heating element connected thereto, of a flat casing having an area extending over that of the ironing sole and defining a shallow steam distributor, a steam ingress in the top wall of said casing, and a plurality of spaced steam egresses in the bottom wall of said casing.

23. In an electric steam iron, in combination with an ironing sole and a heating element connected thereto, of a flat casing having an area extending over that of the ironing sole, said casing defining a shallow steam distributor, plug-projections in the bottom wall of said casing, a steam ingress in the top wall of the casing, steam egresses in said plug-projections, and thermal conducting liners on the inside of said plug-projections.

24. An electric steam iron comprising an ironing sole, a heater connected to the ironing sole, a circuit therefor, a steam generating receptacle, a separate electric heater for the steam generating receptacle, a circuit therefor, and a thermostat local to said first heater circuit.

25. In an electric steam iron, an ironing sole, an electric heater connected thereto, an enclosing casing for the parts of the iron, a steam generating receptacle within the casing, and a spring-held filler cap for the receptacle movably mounted on said enclosing casing.

26. In an electric iron, a heat distributor, an ironing sole connected thereto, a high temperature electric heating element localized at one region of said heat distributor, and a highly polished metal shield over said heating element.

27. An electric steam iron comprising an ironing sole, an electric heater for the ironing sole, a steam generating receptacle, a separate electric heater for the steam generating receptacle, and means thermally connecting the ironing sole heater with the steam generating receptacle.

28. An electric steam iron unit comprising within the unit an ironing sole, an electric heater for the ironing sole, a water holding and steam generating receptacle, a separate electric heater for the water holding and steam generating receptacle, and means thermally connecting the ironing sole heater with the steam generating receptacle capable of keeping the water therein at a high temperature when the steam generating heater is shut off.

29. An electric steam iron unit comprising within the unit an ironing sole, an electric heater for the ironing sole, a water holding and steam generating receptacle, a separate electric heater for the water holding and steam generating receptacle, a steam distributor connecting said receptacle to the ironing sole, and means thermally connecting the ironing sole heater with the steam generating receptacle and the steam distributor.

30. An electric steam iron unit comprising within the unit an ironing sole, an electric heater connected to the ironing sole, a circuit therefor, a water holding and steam generating receptacle, a separate electric heater for the water holding and steam generating receptacle, a circuit therefor, and a thermostat local to said first heater circuit.

31. An electric steam iron unit comprising within the unit an ironing sole, an electric heater connected to the ironing sole, a circuit therefor, a thermostat switch local to said circuit, a water holding and steam generating receptacle, a separate electric heater for the water holding and steam generating receptacle, a circuit therefor, and a manually controlled switch local to said last mentioned circuit.

32. An electric steam iron comprising an ironing sole, an electric heater connected to the ironing sole, a circuit therefor, a thermostat switch local to said circuit, a water holding and steam generating receptacle, a separate electric heater for the water holding and steam generating receptacle, a circuit therefor, and a steam distributor and superheater connecting said receptacle to the ironing sole.

LESTER L. JONES.